United States Patent
Goel et al.

(10) Patent No.: US 11,381,996 B2
(45) Date of Patent: *Jul. 5, 2022

(54) VIDEO PACING BASED ON RADIO CONDITIONS

(71) Applicant: Altiostar Networks, Inc., Tewksbury, MA (US)

(72) Inventors: Anupam Kumar Goel, Bangalore (IN); Utkarsh Srivastava, Lucknow (IN)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,280

(22) Filed: Sep. 3, 2019

(65) Prior Publication Data

US 2019/0394670 A1 Dec. 26, 2019

Related U.S. Application Data

(63) Continuation of application No. 14/926,800, filed on Oct. 29, 2015, now Pat. No. 10,419,967.

(51) Int. Cl.
*H04W 28/12* (2009.01)
*H04W 28/20* (2009.01)
*H04W 28/02* (2009.01)
*H04L 47/24* (2022.01)

(52) U.S. Cl.
CPC ... *H04W 28/0273* (2013.01); *H04W 28/0278* (2013.01); *H04L 47/245* (2013.01); *H04W 28/0226* (2013.01)

(58) Field of Classification Search
CPC ......... H04W 28/0273; H04W 28/0278; H04W 28/0226; H04L 47/245
See application file for complete search history.

(56) References Cited

U.S. PATENT DOCUMENTS

| | | | |
|---|---|---|---|
| 6,757,273 B1* | 6/2004 | Hsu | H04W 72/0453 370/349 |
| 2002/0133589 A1* | 9/2002 | Gubbi | H04L 47/15 709/225 |
| 2005/0262241 A1* | 11/2005 | Gubbi | H04L 1/16 709/225 |
| 2007/0030819 A1* | 2/2007 | Bichot | H04L 47/196 370/315 |
| 2007/0230909 A1 | 10/2007 | Mukaide et al. | |

(Continued)

*Primary Examiner* — Luat Phung
(74) *Attorney, Agent, or Firm* — Mintz Levin Cohn Ferris Glovsky and Popeo, P.C.

(57) ABSTRACT

A method, an apparatus, a computer-program product, and a system for determining bandwidth for transmission of data packets are disclosed. A data packet in a plurality of data packets is received. An amount of bandwidth required for transmission of the received data packet is determined. The amount of bandwidth is a portion of a total available bandwidth for a radio link. At least one condition associated with the radio link for transmitting the received data packet to a user device is determined. Based on the determined amount of bandwidth and the determined condition, the received data packet is transmitted to the user device. Another data packet in the plurality of data packets is transmitted using another portion of the total available bandwidth.

20 Claims, 14 Drawing Sheets

(56) References Cited

U.S. PATENT DOCUMENTS

| | | | |
|---|---|---|---|
| 2012/0188882 A1* | 7/2012 | Wilkinson | H04N 21/6473 370/252 |
| 2013/0176854 A1* | 7/2013 | Chisu | H04W 80/06 370/241 |
| 2013/0219250 A1* | 8/2013 | Lasserre | H03M 13/353 714/776 |
| 2013/0339543 A1* | 12/2013 | Fall | H04L 1/1825 709/233 |
| 2014/0286258 A1* | 9/2014 | Chowdhury | H04L 1/1854 370/329 |
| 2014/0366070 A1* | 12/2014 | Lee | H04N 21/2402 725/62 |
| 2016/0037509 A1* | 2/2016 | Tiger | H04L 69/02 370/329 |

* cited by examiner

VIDEO PACING BASED ON RADIO CONDITIONS

CROSS-REFERENCE

The present application is a continuation of and claims priority to U.S. patent application Ser. No. 14/926,800 to Anupam Kumar Goel, et al., filed on Oct. 29, 2015, now U.S. Pat. No. 10,419,967, issued on Sep. 17, 2019, and entitled "Video Pacing Based on Radio Conditions", and incorporates its disclosures herein by reference in its entirety.

TECHNICAL FIELD

The subject matter described herein generally relates to data processing and in particular, to pacing of video data in a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications links typically connect endpoint devices (e.g., mobile telephones, personal computers, servers, etc.) so that devices can transmit data to one another. Data transmissions are typically governed by various protocols that are specified in the Internet protocol suite, which includes the networking model and a set of communications protocols used for the Internet and/or similar networks. The Internet protocol suite is typically referred to as TCP/IP and contains its most important protocols: the Transmission Control Protocol ("TCP") and the Internet Protocol ("IP"). The TCP/IP model and protocols are maintained by the Internet Engineering Task Force ("IETF"). TCP/IP provides end-to-end connectivity specifying how data should be formatted, addressed, transmitted, routed and received at the destination endpoint device. TCP/IP protocols are organized into the following four abstraction layers (from lowest to highest): the link layer (containing communication technologies for a single network segment (link)), the internet layer (connecting independent networks to establish internetworking), the transport layer (handling process-to-process communication), and the application layer (providing interfaces to the user and support services).

Video data that is typically transmitted using TCP can consume a large amount of bandwidth associated with a radio link between a base station and a user device. As such, various problems can occur, including, poor connectivity and/or experience to the user, data loss, congestion, redundant transmissions, battery power loss (e.g., in user equipment), and others. Thus, there is a need to provide a wireless communication system that is capable of providing an efficient, cost-effective and reliable transmission of video data between endpoint devices using TCP.

SUMMARY

In some implementations, the current subject matter relates to a computer-implemented method for determining bandwidth for transmission of data packets. The method can include receiving a data packet in a plurality of data packets, determining an amount of bandwidth required for transmission of the received data packet, the amount of bandwidth being a portion of a total available bandwidth for a radio link, determining at least one condition associated with the radio link for transmitting the received data packet to a user device, transmitting, based on the determined amount of bandwidth and the determined condition, the received data packet to the user device, and transmitting at least another data packet in the plurality of data packets using another portion of the total available bandwidth. At least one of the receiving, the determining the at least one requirement, the determining the at least one condition, the transmitting the received data packet, and transmitting another data packet can be performed using at least one processor of at least one computing system.

In some implementations, the current subject matter can include one or more of the following optional features. In some implementations, an evolved node (eNodeB) base station can perform at least one of the above operations. The eNodeB base station can include at least one processor and at least one memory.

In some implementations, the requirements can include a bandwidth requirement for transmission of the received data packet between the user device and the eNodeB base station. The conditions can include at least one of the following: a position of the user device with respect to the eNodeB base station and a modulation and coding scheme associated with the radio link.

In some implementations, the processor can schedule transmission of the data packets from a server to the user device using the transmission control protocol (TCP). The transmission can include throttling at least one data transmission on a radio bearer associated with the radio link to increase available bandwidth for transmission of the received data packet.

In some implementations, the data packet can be a video data packet. The video data packet can include data required for reproduction of the video data packet on the user device.

In some implementations, the plurality of data packets can be transmitted using transmission control protocol.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide a long term evolution radio access network having intelligent capabilities, including transmission of data using TCP as well as pacing of video data based on radio conditions.

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
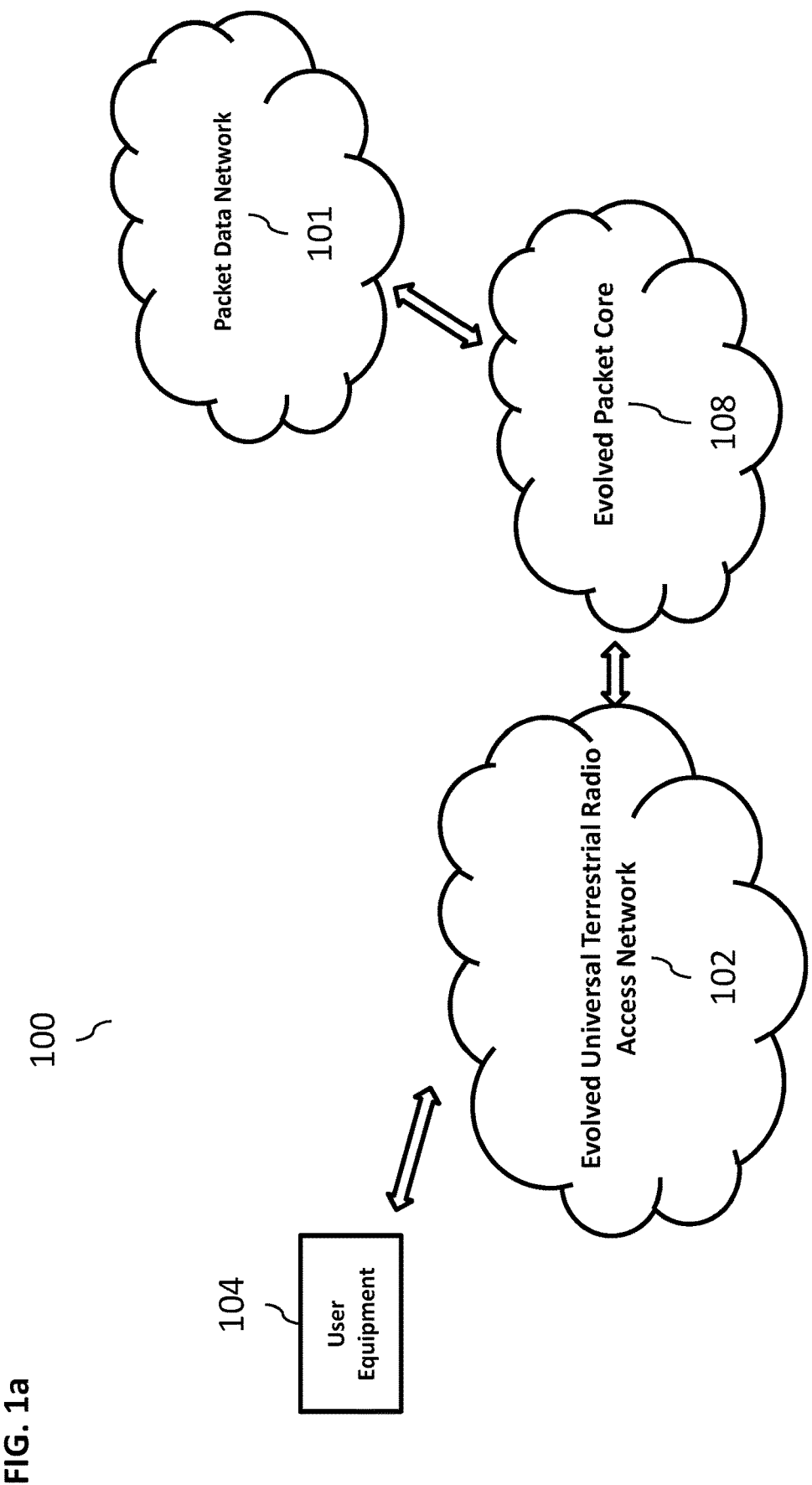
FIG. 1a illustrates an exemplary conventional long term evolution ("LTE") communications system.
Figure 1B:
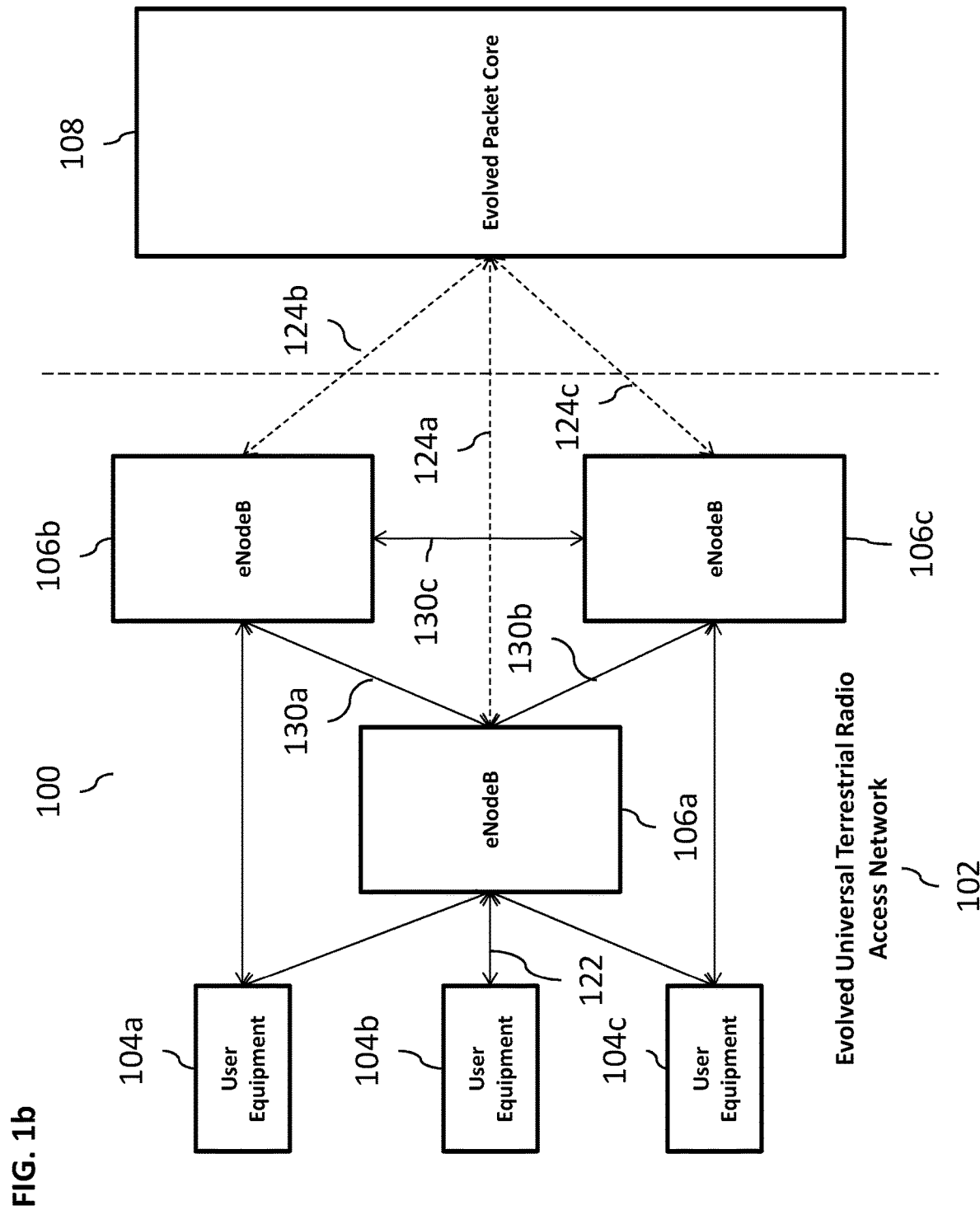

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
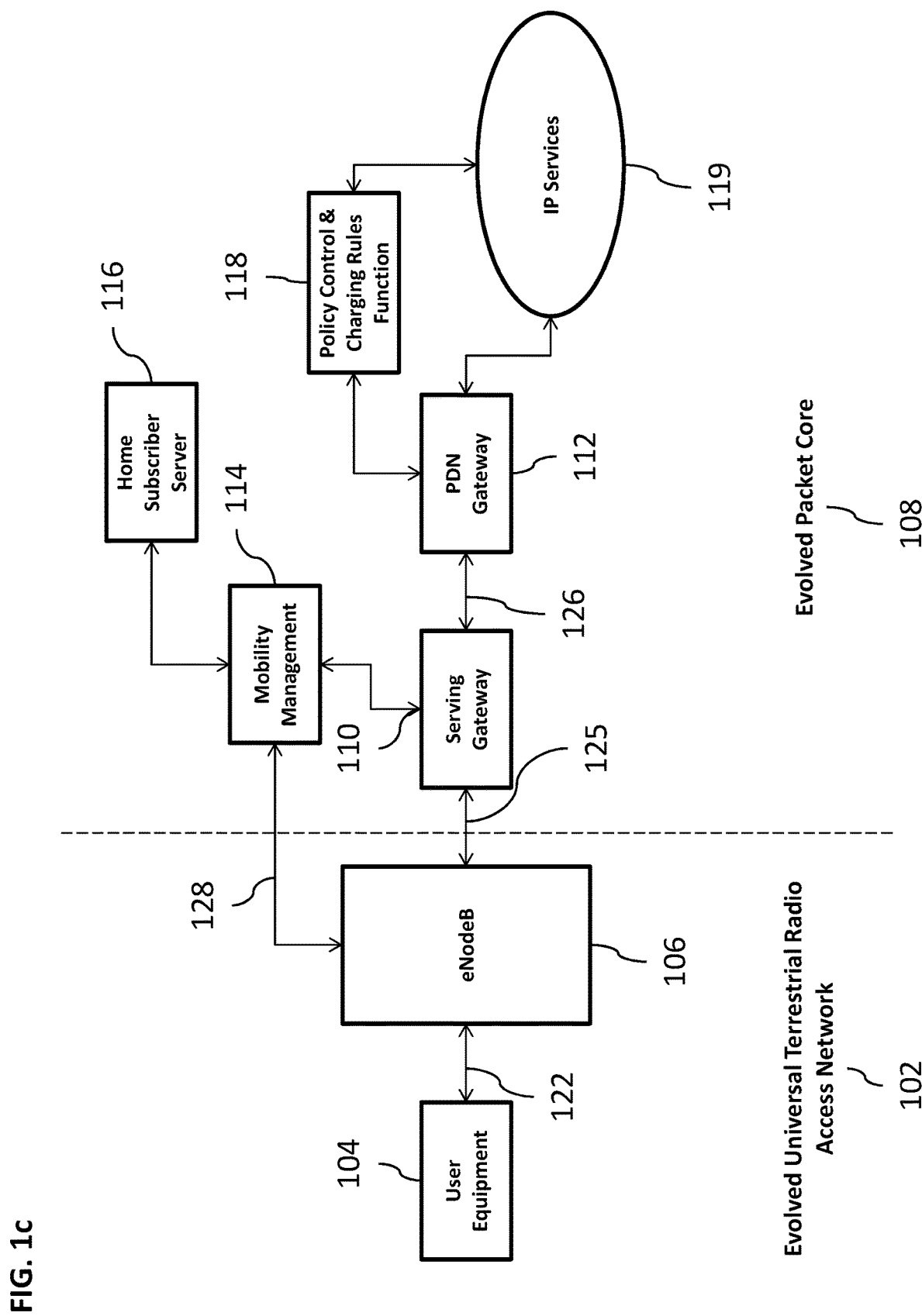

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 112. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
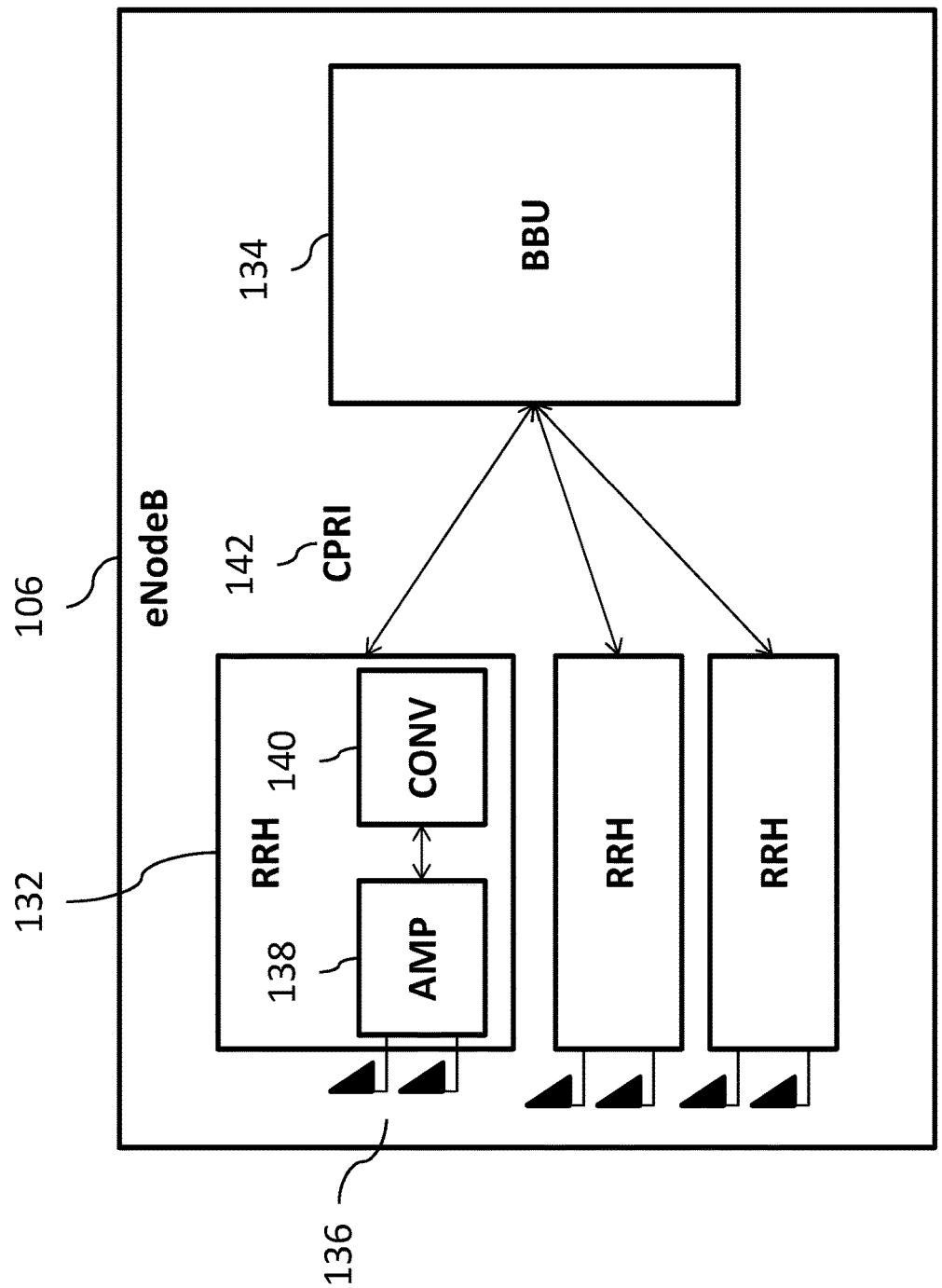

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
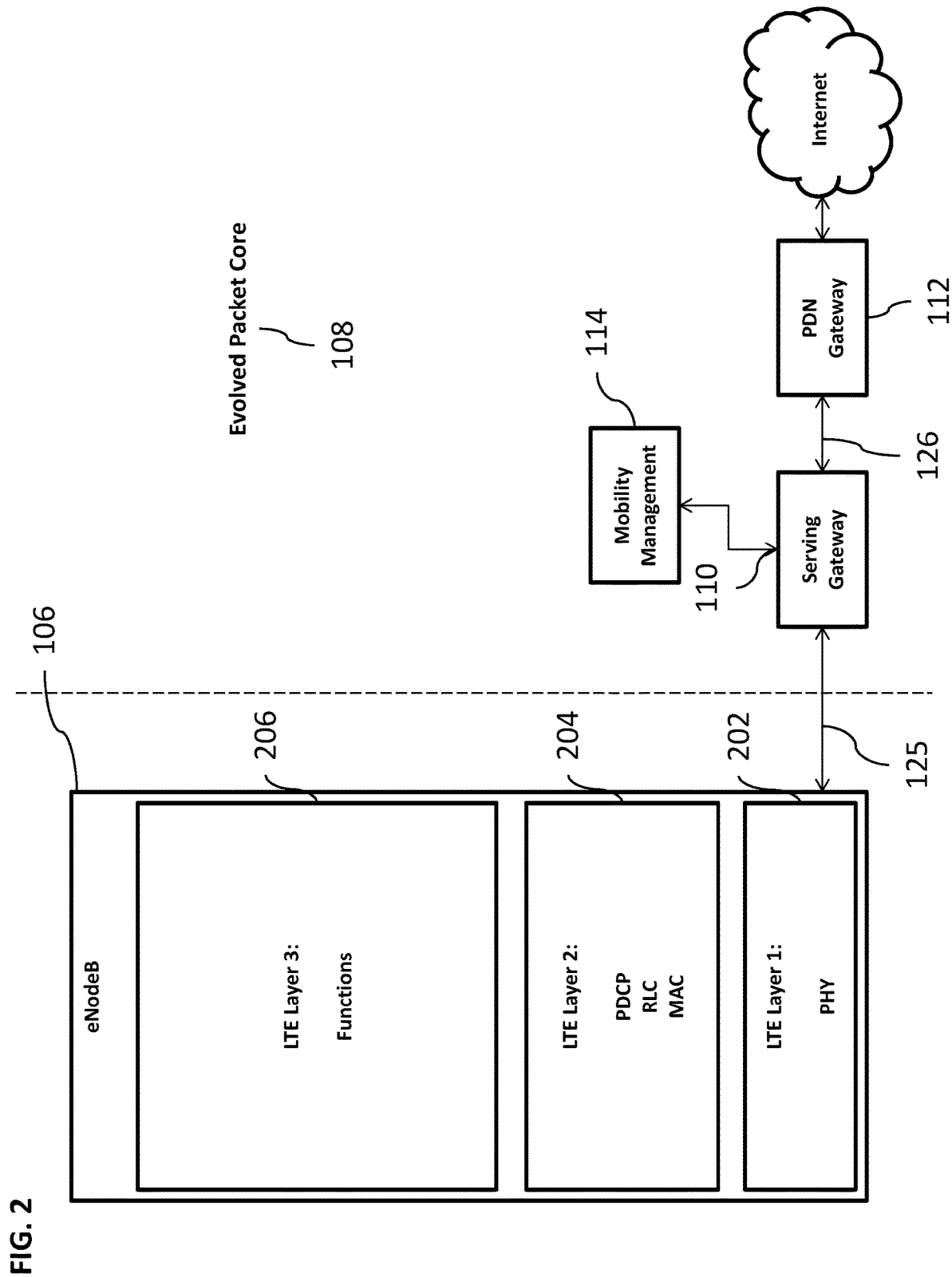
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 incudes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

Figure 3:
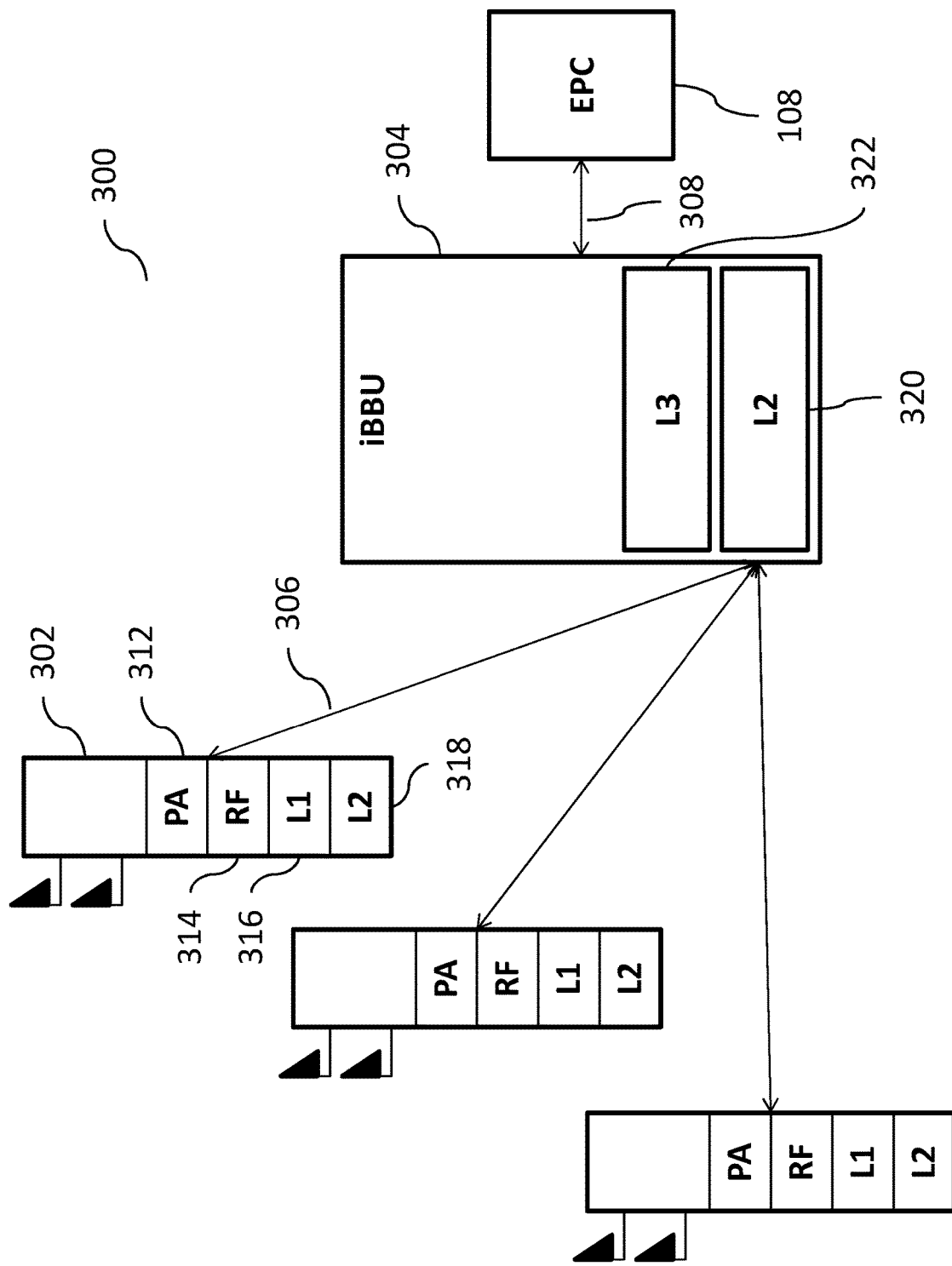
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

In some implementations, the current subject matter system can implement and/or otherwise use transmission control protocol ("TCP") for the purposes of data transmissions between a user equipment and a server via an eNodeB. The eNodeB can handle TCP transmissions and can include a TCP processor that can act as a component for managing such data transmissions.

TCP is considered as one of the core protocols of the Internet protocol suite ("IP") and provides reliable, ordered, error-checked delivery of a stream of octets between programs running on devices that can be connected to a network (e.g., a local area network, intranet or the public Internet. TCP resides in the transport layer. TCP accepts data from a data stream, divides it into chunks, and adds a TCP header, which creates a TCP segment. The TCP segment is then encapsulated into an IP datagram and exchanged with peer devices.

A TCP segment includes a TCP header and a data section. The TCP header contains ten mandatory fields and an optional extension field. The data section follows the header and includes payload data carried for an application. The length of the data section is calculated by subtracting the combined length of the TCP header and the encapsulating IP header from the total IP datagram length (as specified in the IP header). Web browsers or other applications use TCP, when they connect to servers on the World Wide Web, to deliver payload data (e.g., email, files, etc.) and/or transfer files from one location to another.

TCP protocol operations include three phases: connection establishment, data transfer, and connection termination. Connection establishment involves a multi-step handshake process which is followed by the data transfer phase. After data transmission is completed, the connection termination phase closes established virtual circuits and releases all allocated resources. TCP connections are managed by an operating system through a programming interface that represents an endpoint for communications, i.e., an Internet socket.

To establish a connection, TCP uses a three-way handshake. However, before a client (e.g., a software application, an endpoint device (e.g., a personal computer, a wireless device, a server, etc.)) can connect to a server, the server performs a passive open procedure (i.e., binding to and listening at a port to open it up for connections). Once established, the client application initiates an active open. During the active open, the three-way handshake includes: sending a SYN packet from the client to the server, where the client sets the segment's sequence number to a random value; sending a SYN-ACK packet from the server in reply, where the packet includes an acknowledgment number that is set to one more than the received sequence number and a sequence number chosen by the server for the packet, where the sequence number is another random number; and sending an ACK packet from the client back to the server. In the ACK packet, the sequence number is set to the received acknowledgement value and the acknowledgement number is set to one more than the received sequence number.

To terminate a connection, a four-way handshake is used, where each side (client and server) terminates connection independently. When an endpoint device wishes to stop its half of the connection, it transmits a FIN packet, where the other endpoint device acknowledges with an ACK packet. The acknowledgement number in the ACK packet is set to one more than the sequence number received in the FIN packet. Thus, connection termination typically includes a pair of FIN and ACK packets from each TCP endpoint device.

Transmission of data using TCP can occur between devices in wired and/or wireless communications networks. To allow use of the TCP for data transmission purposes between user equipment in a wireless network (such as networks discussed in connection with FIGS. 1a-3 above) and servers, a TCP processor can be included in the eNodeB. In some implementations, use of TCP can be implemented even if the TCP processor is not included in the eNodeB.

Figure 4:
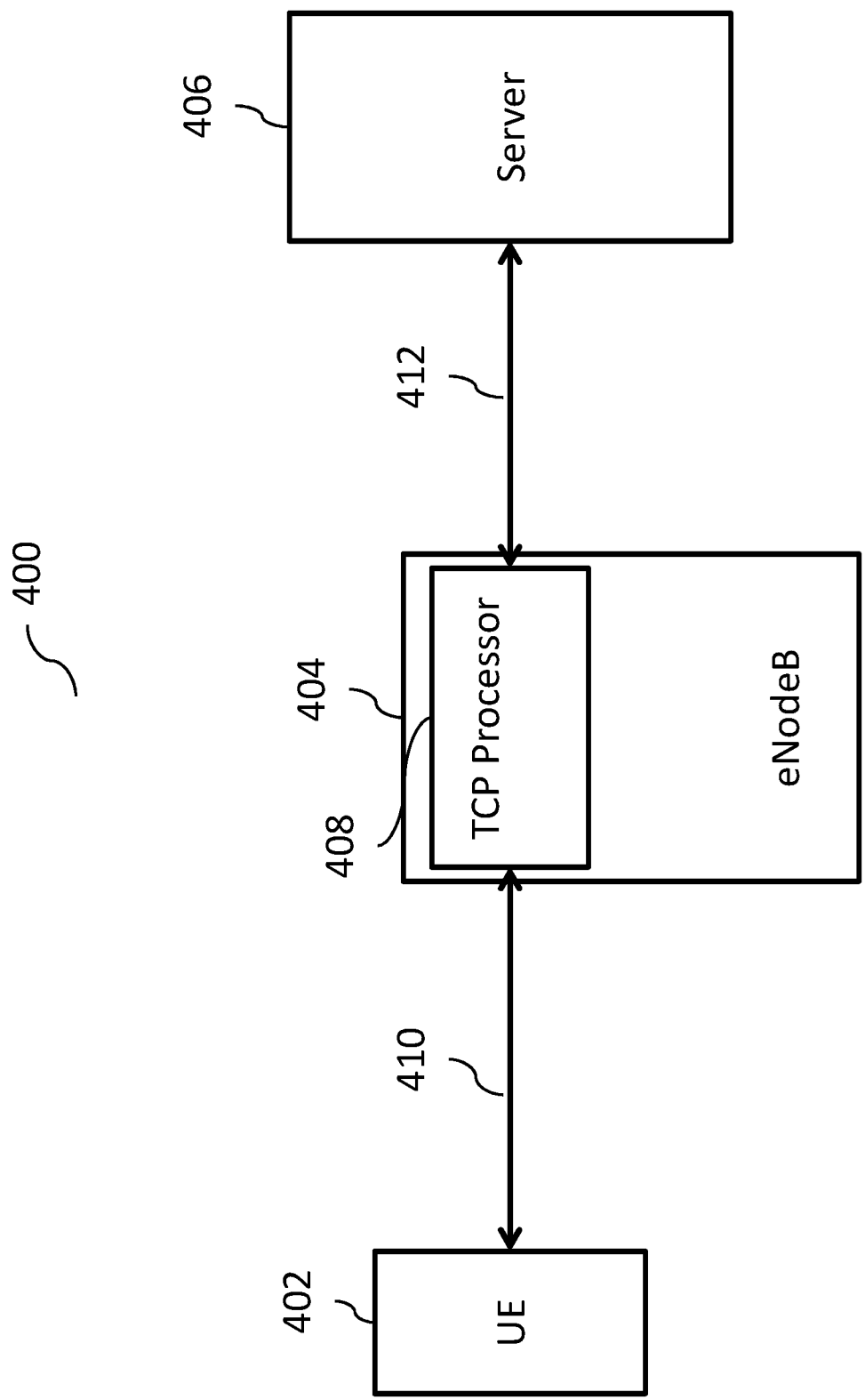
FIG. 4 illustrates an exemplary communications system that includes a transmission control protocol ("TCP") functionality in a base station, according to some implementations of the current subject matter.

FIG. 4 illustrates an exemplary system 400 having a TCP processor 408 in an eNodeB, according to some implementations of the current subject matter. The system 400 can include an eNodeB 404 and/or any other type of base station communicatively coupled with a user equipment 402 via an over-the-air link 410 and with a server 406 via link 412. The server 406 can be part of the core network (not shown in FIG. 4) and/or can be a server outside of the core network. The server 406 can include and/or obtain data that is desired by the user equipment 402. The user equipment 402 can communicate with the eNodeB 404, as discussed above in connection with FIGS. 1a-3. The eNodeB 404 can include the structure shown in FIG. 3 and discussed above.

In some implementations, the TCP processor 408 can be a software module and/or any combination of hardware and/or software components that can be disposed in a base station (e.g., eNodeB 404). These components can be separate from other components of the base station and/or share components with other hardware and/or software disposed in the base station.

To establish connection between the user equipment 402 and the server 406, the user equipment 402 can establish connection with the TCP processor 408, which can also establish connection with the server 406. Alternatively, the user requirement 402 can communicate directly with the server 406 using TCP. The TCP processor 408 can transmit data received from the user equipment 402 to the server 406 as well as transmit data received from the server 406 to the user equipment 402.

In TCP transmissions, throughput of a communication can be limited by two windows: a congestion window ("CNWD") and a receive window ("RW"). CNWD determines the number of bytes that can be outstanding to be acknowledged, at any time during a TCP transmission. This is different from TCP window size maintained by the receiver of data. CNWD prevents a link between two endpoints of the connection from getting overloaded with too much data traffic. The size of CNWD is calculated by estimating how much congestion there is between the two endpoints. The sender of data typically maintains CNWD. When a connection is set up, CNWD (a value maintained independently at each host) is set to a small multiple of the maximum segment size ("MSS") allowed on the connection. Further variance in the congestion window is determined by the known additive increase/multiplicative decrease ("AIMD") approach (i.e., a feedback control algorithm used in TCP congestion avoidance, which increases transmission rate (window size) until data loss occurs and/or increases CNWD by a fixed amount every round trip time. When congestion is detected, the transmitter decreases the transmission rate by a multiplicative factor (e.g., cut the congestion window in half after data loss)). If all segments are received and the acknowledgments reach the sender on time, a constant value is added to the window size. The window grows exponentially until an acknowledgement timeout occurs or the receiver reaches its limit (a threshold value "ssthresh"). After this, CNWD increases linearly at the rate of mss*mss/cwnd packets on each new acknowledgement received. When an acknowledgement timeout occurs, the following occurs: congestion window is reset to 1 MSS, "ssthresh" is set to half the window size before packet loss started, and "slow start" is initiated. A system administrator can adjust the maximum window size limit and/or adjust the constant added during additive increase, as part of TCP tuning. The flow of data over a TCP connection is also controlled by RW, which is provided by the receiver of data. The sender determines how much data it can send by comparing its own CNWD with RW.

To avoid congestion, CNWD should not exceed capacity of the network on which the data is transmitted. To prevent overflow of data, RW should not exceed capacity of receiver equipment to process data. The receiver equipment can be overwhelmed by data if the receiver (e.g., a Web server) is very busy. Typically, each TCP segment can contain a current value of RW. If a sender receives an ACK, acknowledging byte 1000 and specifying RW size of 5000 bytes, the sender will not send data packets after byte 6000, even if the CNWD allows it. Other congestion control algorithms can be used.

Figure 5:
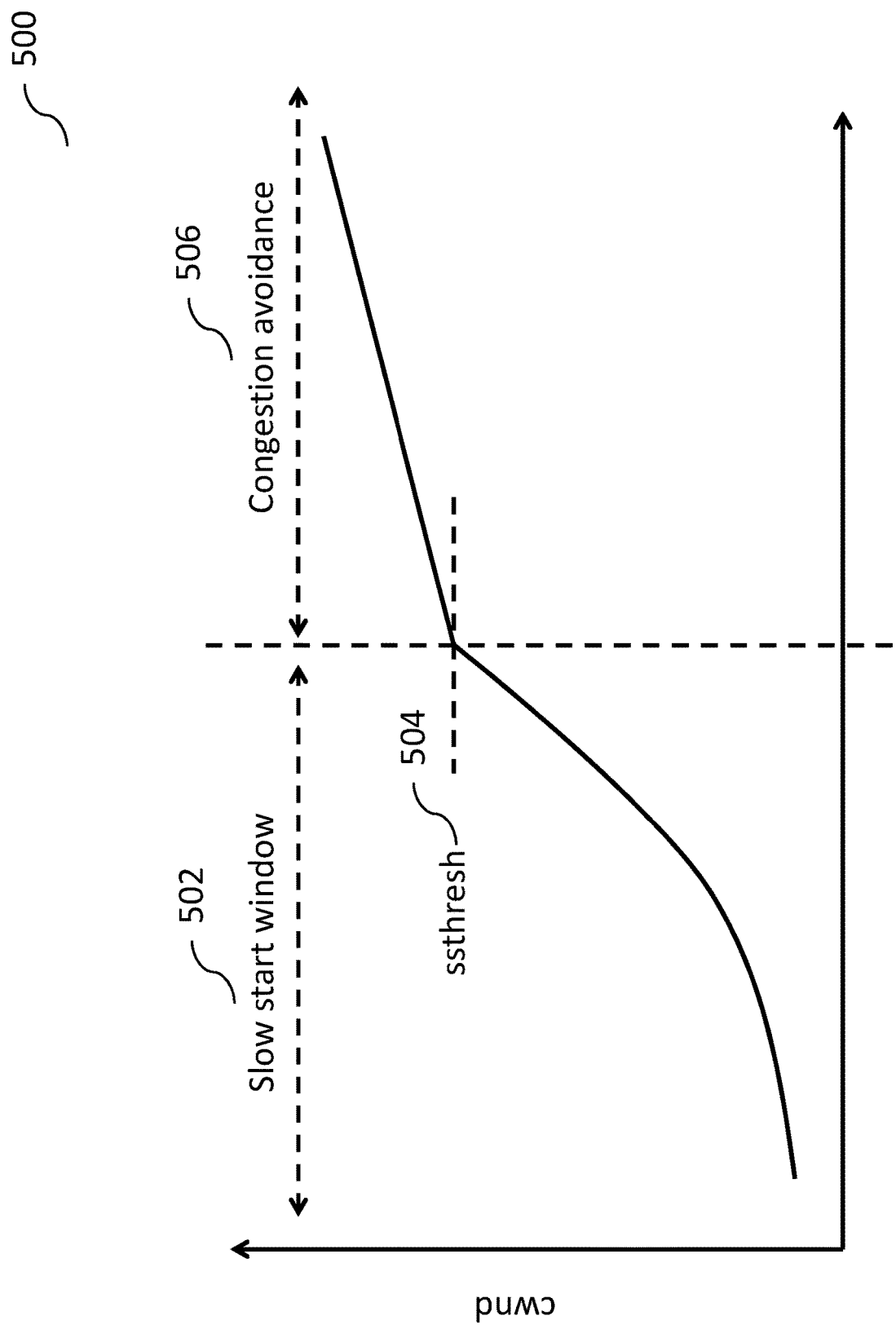
FIG. 5 illustrates an exemplary congestion window control in TCP communications.

In some implementations, the TCP processor 408 can implement control of initial window ("IW"), RW, and CNWD and/or perform other TCP-related functions to avoid congestion of a connection and thus, a loss of data packets. As shown in FIG. 5, in the slow start window 502 and prior to reaching the "ssthresh" threshold value 504, the TCP processor 408 can perform assignment of priority to data packets. Additionally, during the slow start window 502, the TCP processor 408 can perform an aggressive scheduling of data packets for transmission in the event that there exists a good radio frequency signal between the user equipment 402 and the eNodeB 404. Conversely, if a poor radio frequency signal is detected between the user equipment 402 and the eNodeB 404, the TCP processor 408 can conservatively schedule data packets for transmission. In case of poor radio conditions, the data packets can also be scheduled based on a priority. This way, congestion of the connection, multiple retransmissions and/or loss of data can be avoided.

Further, during the slow start window, the congestion window size can double in size with each round trip that the packet takes, i.e., each time an acknowledgement is received by the server that the packet has been successfully transmitted to and received by the endpoint device, the size of congestion window can increase (depending on the TCP implementation, the size of the congestion window can increase accordingly). Thus, the increase in size of the congestion window can be exponential. Once the congestion avoidance phase is reached, the size of the congestion window can only be increased linearly, as indicated by the straight line in congestion avoidance phase 506 in FIG. 5.

TCP performance can be severely penalized when the server detects packet loss. In some TCP implementations (such as, fast-retransmit implementations), during TCP transmission session, if the server receives duplicate acknowledgements (e.g., three duplicate acknowledgement ("DUP ACKs")), the server can determine that a particular TCP packet has not been received by the endpoint device and ascertain that there is congestion, which will cause the server to reset the congestion window and reduce the "ssthresh" value (e.g., by one half). This situation is illustrated in FIG. 6.

Figure 6:
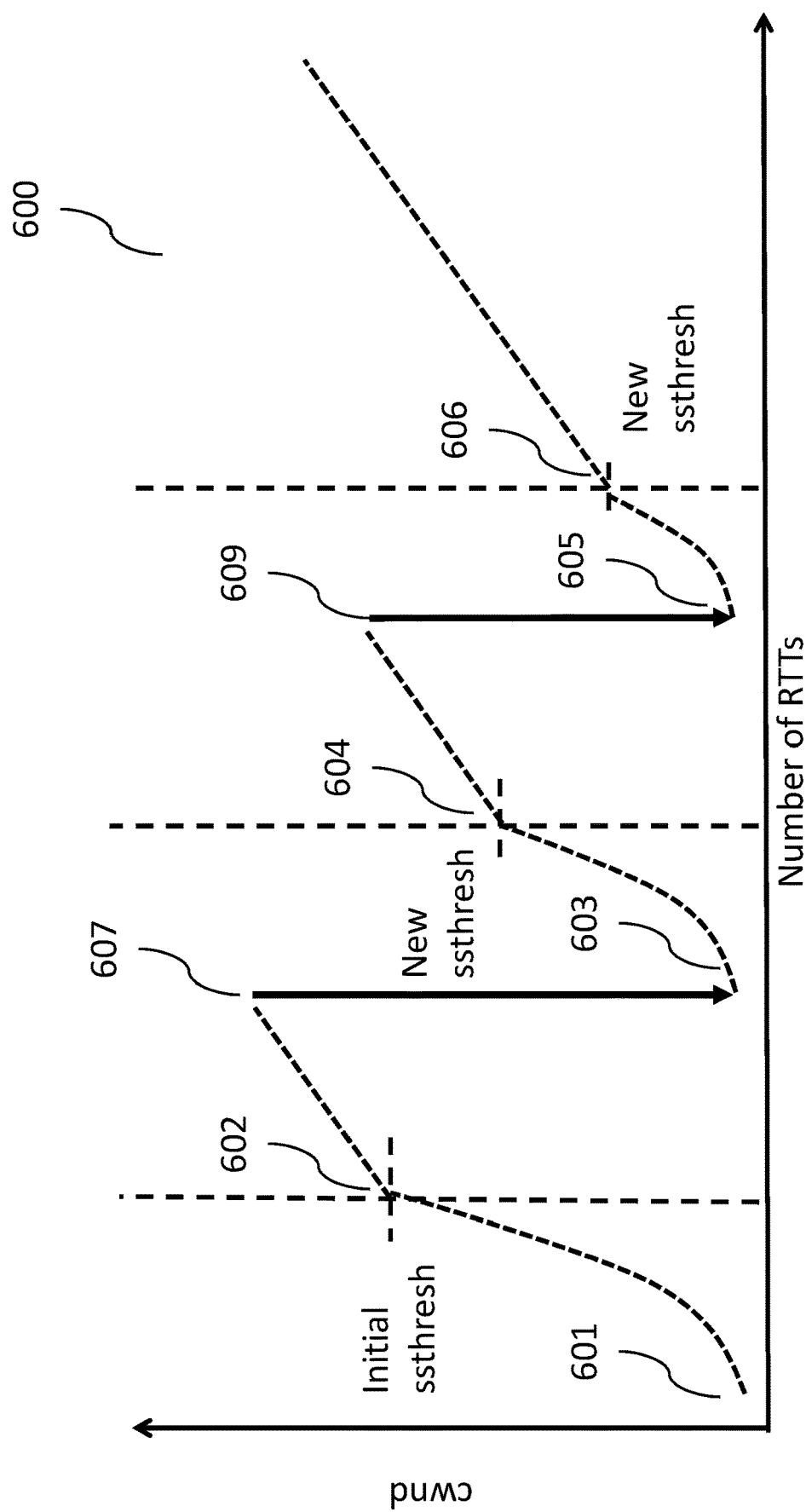
FIG. 6 illustrates further details of congestion window control in TCP communications.

As shown in FIG. 6, a performance of the TCP transmission is illustrated on a plot having a size of congestion window ("CNWD") on the vertical axis and number of roundtrip times ("RTT") (corresponding to the time that it takes the server to receive an acknowledgement that a packet was received) on the horizontal axis. In the slow start phase, the congestion window continues to grow exponentially from an initial size of the congestion window 601. The size of the window grows until an initial threshold 602, after which the size of the congestion window grows linearly until the server (sending the TCP packets) receives an indication that three duplicate ACKs have been received, at 607. After receipt of the three duplicate ACKs, congestion avoidance phase is initiated and the size of CWND is reduced to half. When timeout condition occurs (i.e., at 607), the CWND is reduced to 1. In both cases, the ssthresh is set to current CWND. The size of the congestion window is reset to the initial size 603 (which can be the same as size 601) and the process of growing the size of the congestion window begins again. However, since the size of the congestion window was reset, the ssthresh value is reduced to being smaller than the initial ssthresh 602. The new value of ssthresh 604 can be half of the initial ssthresh 602 (for different TCP implementations (e.g., TCP-Reno, TCP-Vegas, etc.) new ssthresh values can be different and/or congestion avoidance can be implemented in a different fashion). The growth of the size of the congestion window can continue until another three DUP ACKs are received, at 609. At that time, the congestion window is reset to 605 and the value of ssthresh 604 is reduced to ssthresh 606. Then, the process of growing the congestion window can begin again. At some point during this process, the server can determine that the endpoint device is unable to receive its transmissions and terminate the transmission session.

In contrast to an ideal TCP transmission lossless environment, a wireless communications environment can involve a substantial loss of packets. This can cause a server transmitting TCP packet data to constantly reset the congestion window, drop connections, etc., thereby causing substantial delay in delivery of packets, battery drainage, and other undesirable consequences. Data loss can occur as a result of various factors associated with wireless transmissions. For example, in a wireless communications environment, movement of the user equipment from one radio area having a good signal to another radio area having a poor signal can cause delay in delivery of the packets and corresponding ACKs to the server, thereby causing the server to determine that there is congestion on the line. Interference from other radio sources (e.g., other user equipment) can also cause losses. Other factors can affect packet loss as well.

In some cases, by sending too many packets, the TCP sender (e.g., a TCP server) can cause a buffer of eNodeB to overflow. This can occur in view of the buffer having a limited amount of space that can accommodate incoming packets from the TCP sender.

Figure 7:
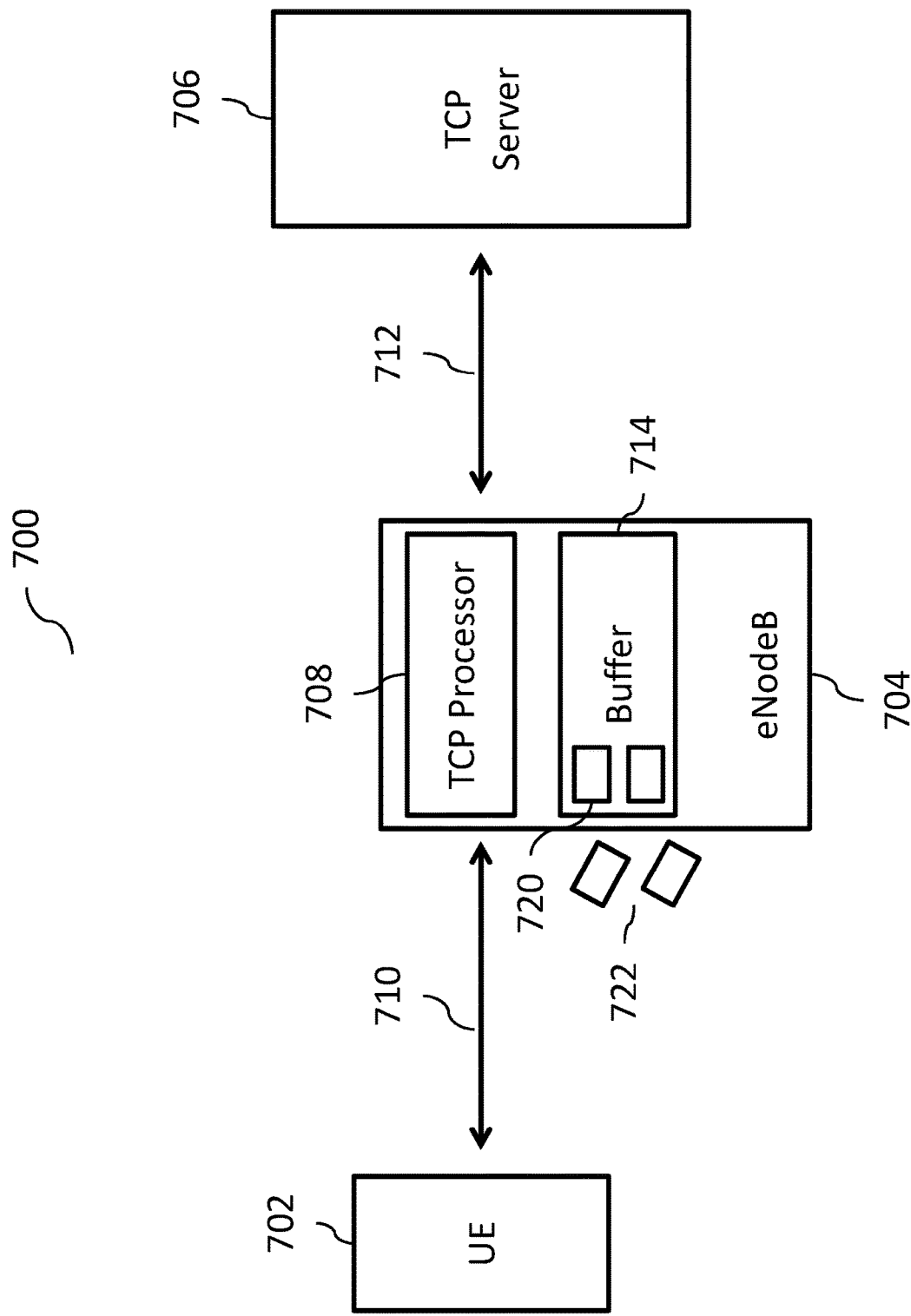
FIG. 7 illustrates an exemplary a communications system that can resolve a buffer overflow situation, according to some implementations of the current subject matter.

FIG. 7 illustrates an exemplary a communications system 700 that can resolve a buffer overflow situation, according to some implementations of the current subject matter. The system 700 can include a user equipment 702, a base station 704 (e.g., an eNodeB), and a TCP server 706. The user equipment 702 can communicate with the eNodeB 704 via communications link 710. The eNodeB 704 can communicate with the TCP server 706 via communications link 712. The TCP server 706 can send TCP packets to the eNodeB 704 for transmission to the user equipment 702. The eNodeB 704 can store the packets in a buffer 714 (that can be disposed on the user equipment side, as shown in FIG. 7). As shown in FIG. 7, while TCP packets 720 can be stored in the buffer 714, other TCP packets 722 can be rejected in view of the buffer 714 being overflowed (e.g., not having enough memory to store data). Buffer overflow can be caused by conditions of the communication links (e.g., CQI, etc.), inability of the user equipment to handle a certain amount of data (e.g., user equipment bandwidth), lack of usable space at the buffer of the eNodeB, etc. The packets 722 can be discarded for failure to be stored in the buffer 714. Such discarding can indicate packet loss, which can cause the TCP server 706 to determine that there is congestion.

In some implementations, to avoid buffer overflow, the TCP Processor 708 can be provided with buffer occupancy status report information of lower Layer's buffer (e.g., RLC/MAC buffer in Layer 2), which can indicate whether or not the buffer 714 can accept a particular amount of data being sent by the server 706. The buffer status report can be provided by lower Layers components such as Layer 2 components of the eNodeB 704. The buffer status report can be used to determine a bandwidth associated with particular user equipment and a buffer occupancy threshold (which can be based on the determined bandwidth associated with the user equipment) for the TCP Processor's buffer 714. In some implementations, different buffer occupancy threshold can be set for different priority packets. Once the value(s) of the buffer occupancy threshold(s) is ascertained, the information can be provided by the TCP Processor 708 to the TCP server 706 using the R-WND along with an ACK that a particular transmission of TCP segments from the TCP server 706 has been received by the user equipment 702. This information can indicate to the TCP server 706 that the eNodeB 704 has a particular receive window ("R-WND"), beyond which a buffer overflow can occur. This can allow the TCP processor 708 inside the eNodeB 704 to control the amount of data that is being sent by the TCP Server 706.

The R-WND can be determined using a round trip time ("RTT") associated with a communications link between the user equipment 702 and the eNodeB 704. The determination can also use an average link rate, which can be provided by the PDCP component of the eNodeB 704 and determined based on a rate at which buffer is cleared by the MAC/RLC components of the eNodeB 704. The R-WND can also be based on a queue control parameter, which can be determined based on the particular communications link, and a maximum queue size per bearer, which can be based on a total queue size. The total number of buffered bytes, which can be determined based on a combination of buffer sizes of buffers at the PDCP component (not shown in FIG. 7) and buffer 714, and a number of active transmission flows can also be used in determining the R-WND. The determined R-WND can be supplied to the TCP server 706. The TCP server 706 can adjust the amount of data that is being sent to the user equipment 702 via the eNodeB 704. This can eliminate packet loss, maintain consistent round trip times for TCP packet transmissions, as well as keep a steady TCP packet flow rate from the TCP server 706 to the user equipment 702 and via the eNodeB 704.

The radio access network including the eNodeBs provided therein is responsible for handling all radio-related functionality including scheduling of radio resources. The core network is responsible for routing calls and data connections to external networks.

The scheduler in the eNodeB is generally responsible for assigning radio resources to all user equipments and radio bearers both in the uplink and downlink. The scheduler in the eNodeB allocates resource blocks (which are the smallest elements of resource allocation) to users for predetermined amounts of time.

Data packets in a communication network correspond to different applications having different, and in some instances, non-standardized formats for the underlying data payload. Without knowledge of the data packet payload, and its corresponding application, coordination of communication of a data packet is provided in a generic fashion. At an eNodeB, assignment of resource blocks occurs at approximately 1 ms intervals. Detection of packet data and corresponding applications outside of the eNodeB, such as using devices in the core network or at the user device, cannot accurately account for changes in the channel conditions that occur at the 1 ms intervals at which the eNodeB assigns resource blocks. For example, an eNodeB can decide the type of modulation encoding mechanism for a data packet transmission, for example, using quadrature amplitude modulation QAM—including 16-QAM, 64-QAM, or the like) and/or quadrature phase shift keying (QPSK) every 1 ms. Such decisions are based on the channel conditions present during the time slice at which the base station is assigning the resource blocks.

In some implementations, in order to accurately assign resource blocks based on the real-time channel conditions at the base station, the eNodeB includes a module and/or processor for inspecting the data packet, including the application type of the data packet, and a module and/or processor for scheduling and assigning resource blocks.

Figure 8:
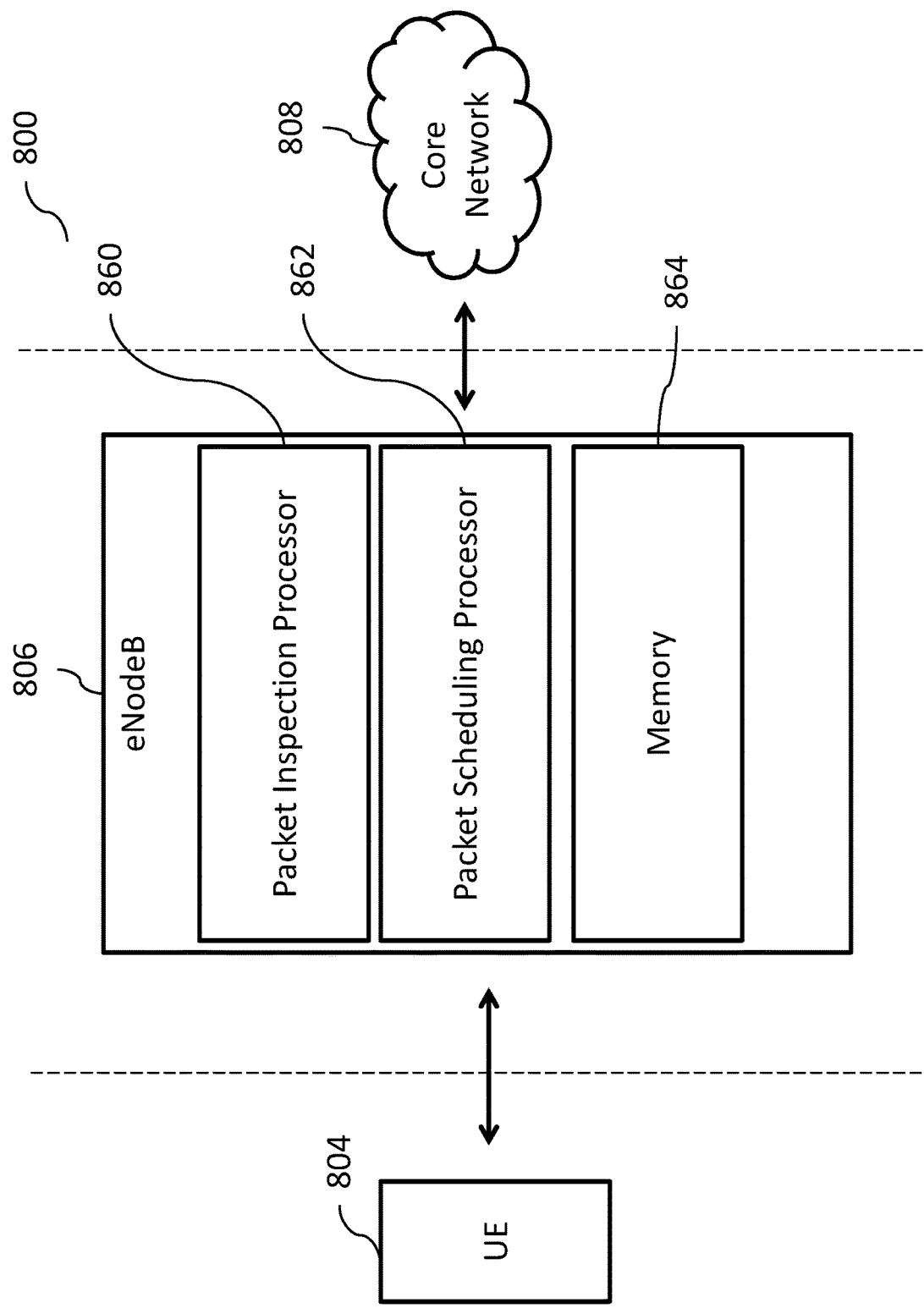
FIG. 8 illustrates an exemplary system including an eNodeB for coordinating communication between a user equipment and a core network, according to some implementations of the current subject matter.

FIG. 8 illustrates an exemplary system 800 including an eNodeB 806 for coordinating communication between a user equipment 804 and a core network 808, according to some implementations of the current subject matter. The eNodeB 806 can correspond to an eNodeB shown and described above with reference to FIG. 3. In the case of C-RAN architecture, such as the one shown in FIG. 3, the eNodeB 806 can correspond to the intelligent baseband unit 304. The eNodeB 806 can include a packet inspection processor 860, a packet scheduling processor 862, and a memory 864. While shown as separate components in FIG. 8, the packet inspection processor 860, a packet scheduling processor 862, and the memory 864 can be integrated in one or more processing components. In some implementations, the packet inspection processor 860 and the packet scheduling processor 862 can be provided as software modules in a processor that is specifically programmed to implement the functions described herein with reference to these processors.

In some implementations, the packet inspection processor 860 can perform a packet inspection on each data packet that is transmitted between the user equipment 804 and the core network 808 in order to determine, for example the application type of the data packet. An application type may correspond to, for example, audio, video, email, and/or any other type. The packet inspection processor 860 communicates the detected application type and/or other information that is derived from the data packet to the packet scheduling processor 862. The packet scheduling processor 862 can assign resource blocks based on predefined settings stored in memory 864 corresponding to the information detected through inspection of the data packet and based on the channel conditions of the communication link with the user equipment and/or the core network.

The packet scheduling processor 862 can take into account the application type, the size of the file associated with the data packet, the provider of the content, the user device type or profile information associated with the user, QoS requirements for the data packet, a channel quality indication ("CQI") determined by the eNodeB 806, a buffer status report ("BSR") of the eNodeB buffer, a power headroom report ("PHR"), and/or a predefined priority for the content corresponding to the data packet content.

Referring back to FIGS. 2 and 3, the packet inspection processor 860 can correspond to a function that is part of layer 3 functions in the base station 106, 304. In some implementations, the packet inspection processor 860 can also be provided on a separate functional layer from the functional layers described with reference to FIGS. 2 and 3. The packet inspection processor 860 can communicate and coordinate with other functions performed by the base station 806.

In some implementations, the packet scheduling processor 862 can be provided on in layer 2 of the base station as shown in FIGS. 2 and 3. In those implementations in which functions of layer 2 are subdivided between the iBBU 304 and iRRHs 302, the packet scheduling processor 862 can be implemented as part of the layer 2 functions that remain with the iBBU 304. The packet scheduling processor 862 can also be provided on a separate functional layer from the functional layers described with reference to FIGS. 2 and 3. The packet scheduling processor 862 can be configured to communicate and coordinate with other functions performed by the base station 806. In some implementations, the packet scheduling processor 862 can coordinate with the MAC layer, and in particular, a hybrid automatic repeat request ("HARQ") manager of the MAC layer, as well as, with a physical layer of the base station.

Typically, a user equipment can have multiple TCP connections on which they are receiving/transmitting various data between the user equipment and a server via an eNodeB. As stated above, the data can be audio, video, text, email, etc. For a user equipment having multiple connections, a radio channel existing between the user equipment and the eNodeB can become a bottleneck of an entire TCP connection. Further, given the amount of data being transferred, the bandwidth of the channel, etc., changes in the channel condition on the radio channel connecting the user equipment and the eNodeB can greatly affect channel capacity and vary packet drop percentage on the channel.

A TCP server (e.g., TCP server 406 shown in FIG. 4) with which the user equipment (e.g., user equipment 402) is communicating via eNodeB (e.g., eNodeB 404) might not be aware of a number of TCP connections that are competing with for a bandwidth of the radio channel. The TCP server can typically enquire for more bandwidth, thereby creating a burst of data. If channel condition of the radio channel is poor, the burst can typically result in a packet loss, a significant packet delay, and/or any other adverse effect on the radio channel. To resolve this issue as well as provide adequate sharing of the bandwidth of the radio channel for the TCP connections that may be active on the user equipment, TCP congestion control can be implemented (as discussed above) for the purposes of varying good-put for the connections and preventing one connection to get an advantageous treatment over the other connections.

However, transmission of video data that typically requires a significant amount of bandwidth can suffer if the radio conditions are poor. The radio conditions can be related to at least one of the following: the modulation and coding scheme ("MCS") in effect over the radio channel has a lower theoretical maximum (e.g., MCS value can be higher in view of better radio conditions), the relative position of the user equipment from the radio antenna, bearer throughout/good-put, etc. This is especially so if other TCP connections are active on the user equipment. As such, transmission of the video data can be paused, stalled, dropped, etc. due to lack of available bandwidth, thereby ruining the user's experience.

MCS denotes a matching of modulation, coding and/or other signal and protocol parameters to the conditions on a radio link. Examples of radio link conditions can include path loss, signal interference from neighboring station, sensitivity of receivers, available transmitter power margin, etc. A rate adaptation algorithm can be used to adapt the MCS based on the quality of the radio channel, including bit rate, robustness of data transmission, etc.

In some implementations, in order to improve transmission of video data (and/or any other type of data requiring a significant amount of bandwidth), TCP receive window adaptation mechanism, as discussed in connection with FIGS. 7 and 8 above, can be implemented for the purposes of controlling a rate of transmission of video data based on a bandwidth requirement of the video data. Hence, only data that is required for playing a video without stalls can be sent by the TCP server (e.g., server 406 as shown in FIG. 4). Thereby, the remaining bandwidth can be used for other TCP or non-TCP flows to the same user equipment and/or other user equipments.

In some implementations, if the user equipment is experiencing poor radio channel conditions (which as stated above can be due to at least one of the following, relative positioning of the user equipment with respect to the radio antenna, etc.), the eNodeB, communicating with the user equipment can determine a required bandwidth for each video data over a particular radio bearer. If required, the eNodeB can throttle other TCP connections on the radio bearer, thereby creating 'space' for the TCP connection(s) that are fetching video. Some of the advantages of the current subject matter can include an ability of the video data to be provided with a required and/or an adequate bandwidth only. Additionally, the proper bandwidth can also reduce the number of bytes that may be required to transmit a video and hence, reduce costs for the user. Further, by avoiding buffer overflow, TCP retransmissions, etc. user costs can be further reduced even if the user decides to stop transmission and/or playing of the video midway (and/or at any time prior to the end of the video) i.e., the user equipment would receive fewer bytes of data). Otherwise, if the full video is viewed and no TCP retransmissions occur, the number of downloaded bytes will remain the same. This can be helpful in the event a disruption occurs on the connection (e.g., user equipment disconnects, connection is dropped, etc.). Also, video flows can be prioritized over other traffic in various channel conditions. Further, bandwidth that has been saved can be used by other user equipments to transmit data.

Figure 9:
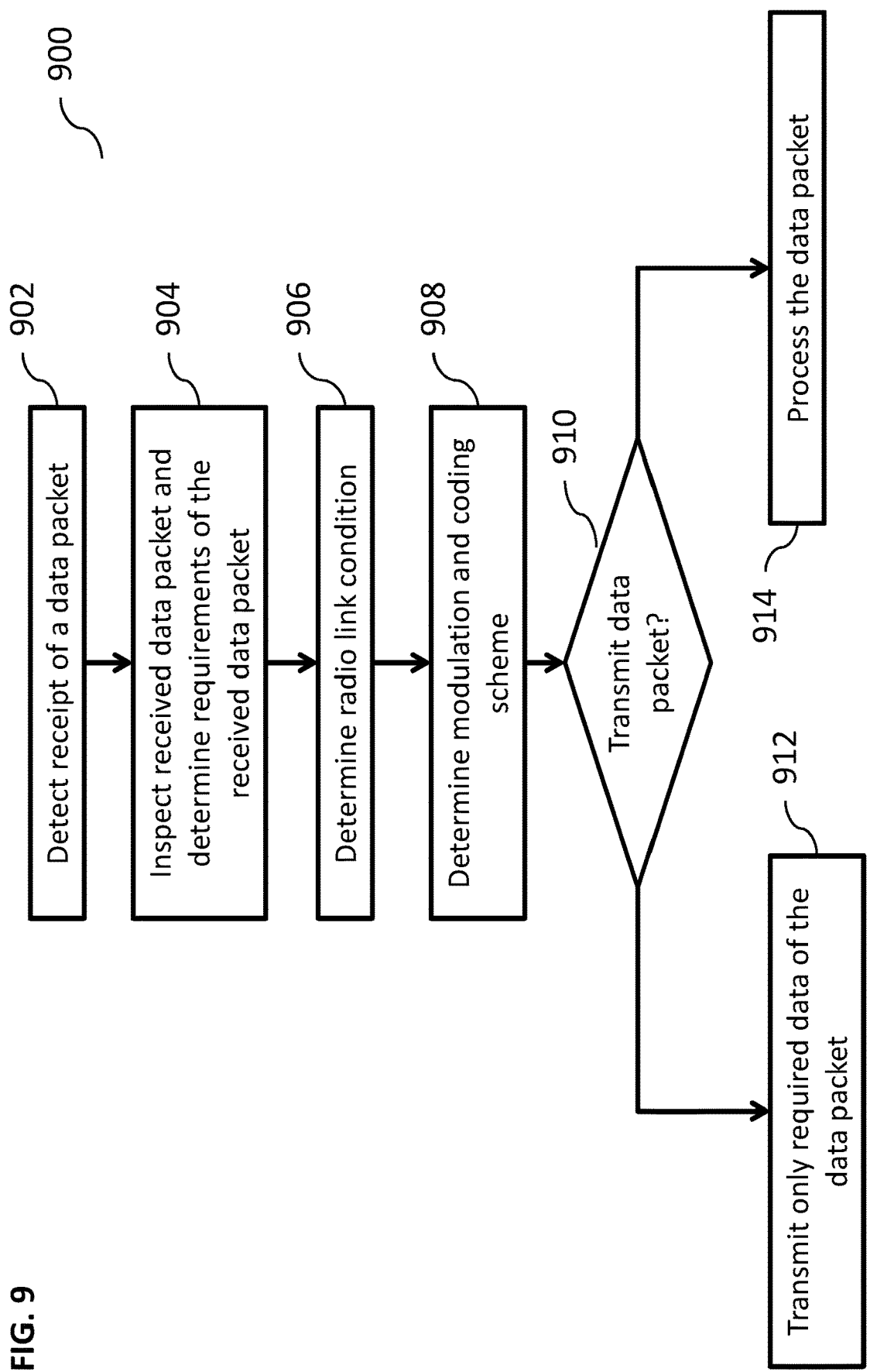
FIG. 9 illustrates an exemplary process for controlling transmission rate of a video data, according to some implementations of the current subject matter.

FIG. 9 illustrates an exemplary process 900 for controlling transmission rate of a video data, according to some implementations of the current subject matter. At 902, the eNodeB (e.g., eNodeB 806 shown in FIG. 8) can detect receipt of a data packet. Upon analysis of the data packet's header, the eNodeB can determine whether or not received data packet contains video data. This can be accomplished, for example, using a packet inspection processor (e.g., packet inspection process 860 shown in FIG. 8). Additionally, upon inspection of received data packet, the eNodeB can determine transmission and/or any other requirements of the data packet, at 904. Such requirements can include specific bandwidth that may be needed for transmission of the data packet, specific data that may be required for transmission of the data packet (e.g., the data packet, such a video data packet, may require specific data for reproducing or playing on the user equipment), as well as any other requirements. For example, if the video traffic requires 8 mbps to play video on a user equipment, but radio conditions allow only 10 mbps to that user equipment and there are other TCP and/or UDP flows, the video flow will be allocated 8 mbps and remaining 2 mbps will be allocated to other flows. The eNodeB can also determine specific radio conditions on a radio link between the eNodeB and the user equipment, to which the received data packet is to be transmitted, at 906. Radio conditions can be important to non-video data flows to a particular user equipment, where once the video data packets have been transmitted (i.e., paced), the remaining data flows (i.e., TCP data flows) will utilize remaining bandwidth for transmission to that user equipment. At 908, the eNodeB can determine a particular modulation and coding scheme in effect for the radio link connecting the eNodeB and the user equipment.

Based on the determined requirements of the received data packet, the assessed radio conditions and/or the modulation and coding scheme in effect, the eNodeB can determine whether to transmit the received data packet to the user equipment or buffer the packet for later transmission, at 910. If the eNodeB determines that the packet is to be transmitted, the eNodeB can only send data that may be required (e.g., data required for reproduction and/or playing of a video data packet, at 912. Data packets can be prioritized for the TCP flow and appropriate data packets can be marked as video flow. This way, the communication link connecting the eNodeB and the user equipment is not consumed by entirety of the received data packet and the bandwidth can be saved for transmission of other data packets that may be received by the eNodeB and destined for the user equipment. The user equipment can also send an ACK to the TCP server (e.g., server 406 shown in FIG. 4) that sent the data packet, which can be indicative that the data packet has been transmitted and/or received by the intended user equipment (as discussed above in connection with FIGS. 7 and 8). The eNodeB can update the RWND in connection with the appropriate ACK segment. In some implementations, video data can be always transmitted. In the event that a buffer overflow is detected and/or continuing, data packets can be discarded. Non-video data packets can be buffered and/or discarded. If data packets have been buffered, they can be transmitted at a later time (e.g., after several milliseconds). In some implementations, if other TCP connections exist on the bearer between the eNodeB and the user equipment, the eNodeB can also throttle such TCP connections (which is an intentional slowing of the connection as a reactive measure, employed in communication networks, to regulate network traffic and minimize bandwidth congestion) to create more space (or free up bandwidth) for the purposes of transmission of the received data packet. If the eNodeB determines that the data packet is not to be transmitted, the data packet can be buffered, discarded and/or otherwise processed (as discussed above in connection with FIGS. 7 and 8), at 914. In some implementations, the user equipment can also forward an ACK to the server, where the eNodeB can manipulate certain fields in the ACK segment to cause the server to slow down when sending data packets and to prevent occurrence of network congestion (as discussed above in connection with FIGS. 7 and 8).

Figure 10:
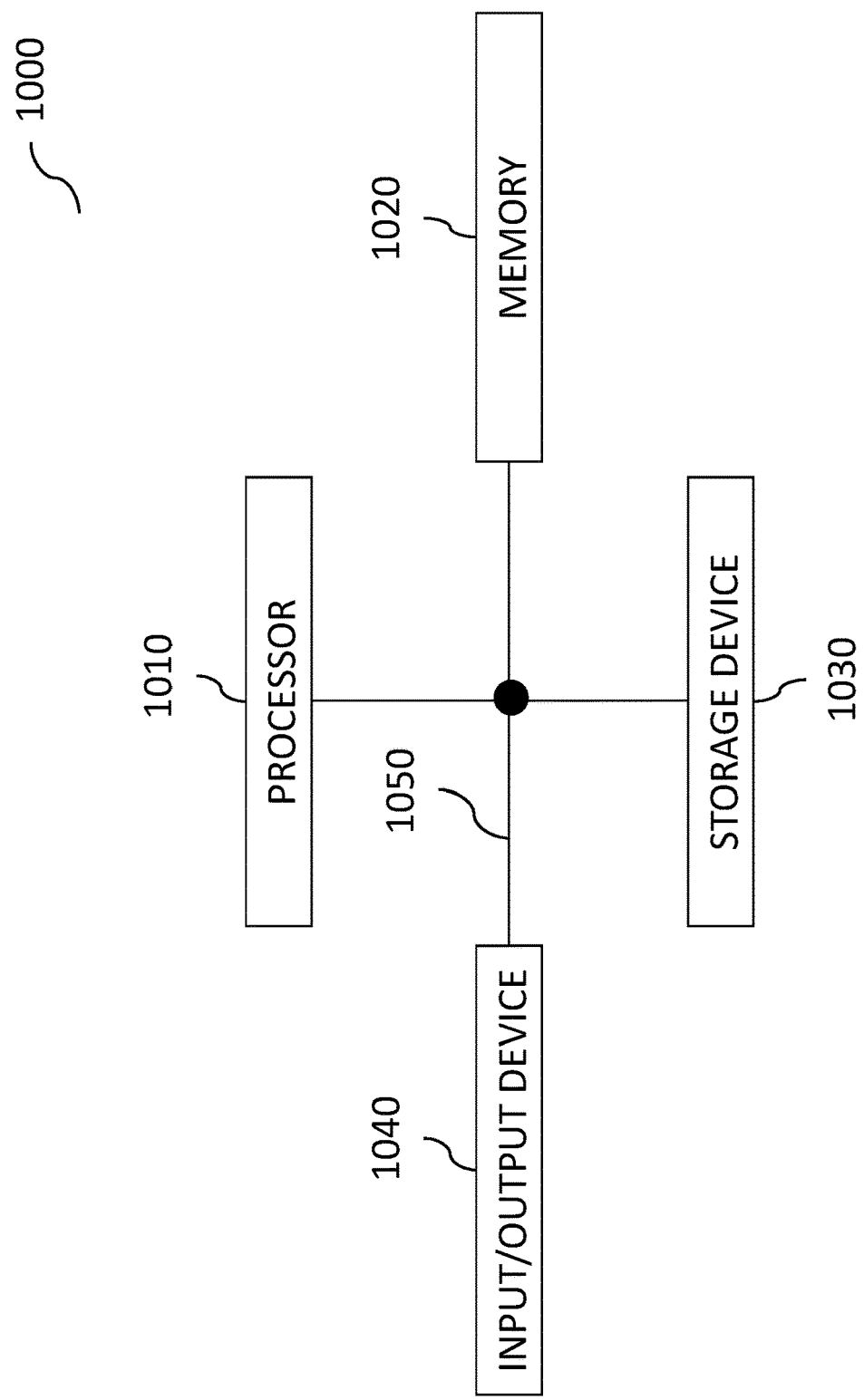
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces. In some implementations, the input/output device 1040 can include a network interface, enabling the system 1000 to communicate to other computers in a network.

Figure 11:
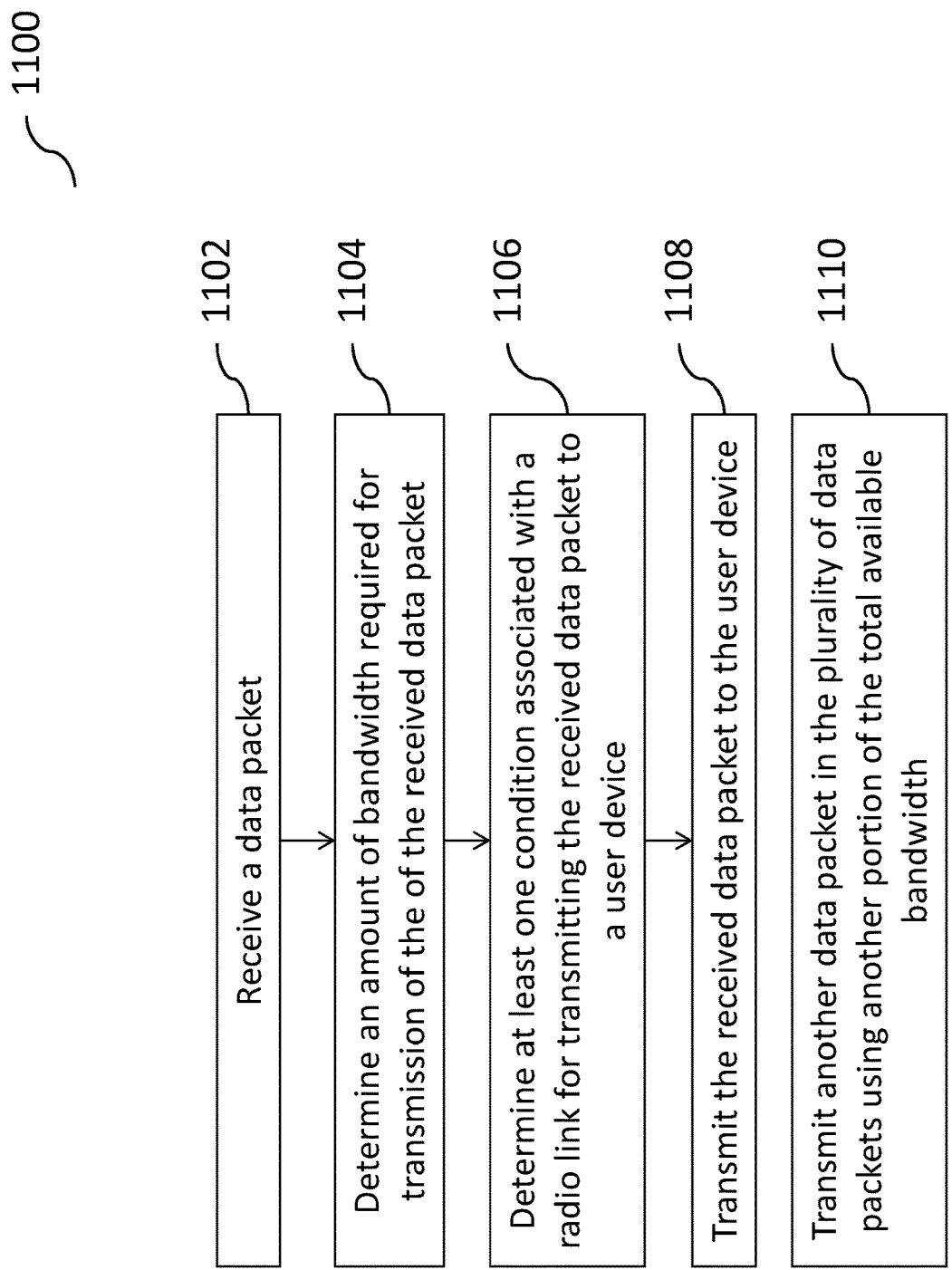
FIG. 11 illustrates an exemplary method, according to some implementations of the current subject matter.

FIG. 11 illustrates an exemplary method 1100 for determining bandwidth for transmission of data packets (e.g., video data packets) to a user device, according to some implementations of the current subject matter. The method 1100 can be performed using a base station (e.g., an eNodeB as described above and shown in FIGS. 3-14). At 1102, a data packet in a plurality of data packets can be received at the eNodeB. The data packets can be part of a video flow, UDP flow, other TCP flows, etc. At 1104, an amount of bandwidth required for transmission of the received data packet can be determined, where the amount of bandwidth can be a portion of a total available bandwidth for a radio link. At 1106, at least one condition associated with the radio link for transmitting the received data packet to the user device can be determined. At 1108, the received data packet can be transmitted from the eNodeB to the user device based on the determined amount of bandwidth and the determined condition of the radio link. At 1110, other data packet in the plurality of data packets can be transmitted using another or remaining portion of the total available bandwidth.

In some implementations, the current subject matter can include one or more of the following optional features. In some implementations, an evolved node (eNodeB) base station can perform at least one of the 1102-1110, as shown in FIG. 11. The eNodeB base station can include at least one processor and at least one memory.

In some implementations, the requirements can include a bandwidth requirement for transmission of the received data packet between the user device and the eNodeB base station. The conditions can include at least one of the following: a position of the user device with respect to the eNodeB base station and a modulation and coding scheme associated with the radio link.

In some implementations, the processor can schedule transmission of the data packets from a server to the user device using the transmission control protocol (TCP). The transmission (at 1108) can include throttling at least one data transmission on a radio bearer associated with the radio link to increase available bandwidth for transmission of the received data packet.

In some implementations, the data packet can be a video data packet. The video data packet can include data required for reproduction of the video data packet on the user device.

In some implementations, the plurality of data packets can be transmitted using transmission control protocol.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, the method comprising:
    receiving a data packet in a plurality of data packets, the receiving including inspecting the data packet;
    determining, based on the inspection of the data packet, an amount of bandwidth required for transmission of the received data packet to a user device and a data required by the user device in connection with the data packet;
    determining at least one condition and a current modulation and coding scheme associated with the radio link for transmitting the received data packet to the user device; and
    transmitting, using the transmission control protocol (TCP), the received data packet to the user device, wherein a receive window available for transmission of the plurality of data packets is updated to determine an updated amount of bandwidth required for transmission of the data packets based on an acknowledgement received from the user device.

2. The method according to claim 1, wherein a base station performs at least one of the receiving, the determining the at least one condition, the determining of the amount of bandwidth required, and the transmitting the received data packet, the base station including at least one processor and at least one memory.

3. The method according to claim 2, wherein the at least one condition includes at least one of the following: a position of the user device with respect to the base station and a quality of a radio signal frequency associated with the radio link.

4. The method according to claim 2, wherein the at least one processor schedules transmission of the data packet from a server to the user device using TCP.

5. The method according to claim 4, wherein the transmitting the received data packet further comprises throttling at least one data transmission on a radio bearer associated with the radio link to increase available bandwidth for transmission of the received data packet.

6. The method according to claim 2, wherein the data packet is a video data packet.

7. The method according to claim 6, wherein the data required by the user device includes data required for reproduction of the video data packet on the user device.

8. An apparatus comprising:
at least one programmable processor; and
a machine-readable medium storing instructions that, when executed by the at least one programmable processor, cause the at least one programmable processor to perform operations comprising:
receiving a data packet in a plurality of data packets, the receiving including inspecting the data packet;
determining, based on the inspection of the data packet, an amount of bandwidth required for transmission of the received data packet to a user device and a data required by the user device in connection with the data packet;
determining at least one condition and a current modulation and coding scheme associated with the radio link for transmitting the received data packet to the user device; and
transmitting, using the transmission control protocol (TCP), the received data packet to the user device, wherein a receive window available for transmission of the plurality of data packets is updated to determine an updated amount of bandwidth required for transmission of the data packets based on an acknowledgement received from the user device.

9. The apparatus according to claim 8, wherein a base station performs at least one of the receiving, the determining the at least one condition, the determining of the amount of bandwidth required, and the transmitting the received data packet, the base station including at least one processor and at least one memory.

10. The apparatus according to claim 9, wherein the at least one condition includes at least one of the following: a position of the user device with respect to the base station and a quality of a radio signal frequency associated with the radio link.

11. The apparatus according to claim 9, wherein the at least one processor schedules transmission of the data packet from a server to the user device using TCP.

12. The apparatus according to claim 11, wherein the transmitting the received data packet further comprises throttling at least one data transmission on a radio bearer associated with the radio link to increase available bandwidth for transmission of the received data packet.

13. The apparatus according to claim 9, wherein the data packet is a video data packet.

14. The apparatus according to claim 13, wherein the data required by the user device includes data required for reproduction of the video data packet on the user device.

15. A computer program product comprising a machine-readable medium storing instructions that, when executed by at least one programmable processor, cause the at least one programmable processor to perform operations comprising:
receiving a data packet in a plurality of data packets, the receiving including inspecting the data packet;
determining, based on the inspection of the data packet, an amount of bandwidth required for transmission of the received data packet to a user device and a data required by the user device in connection with the data packet;
determining at least one condition and a current modulation and coding scheme associated with the radio link for transmitting the received data packet to the user device; and
transmitting, using the transmission control protocol (TCP), the received data packet to the user device, wherein a receive window available for transmission of the plurality of data packets is updated to determine an updated amount of bandwidth required for transmission of the data packets based on an acknowledgement received from the user device.

16. The computer program product according to claim 15, wherein a base station performs at least one of the receiving, the determining the at least one condition, the determining of the amount of bandwidth required, and the transmitting the received data packet, the base station including at least one processor and at least one memory.

17. The computer program product according to claim 16, wherein the at least one condition includes at least one of the following: a position of the user device with respect to the base station and a quality of a radio signal frequency associated with the radio link.

18. The computer program product according to claim 16, wherein the at least one processor schedules transmission of the data packet from a server to the user device using TCP.

19. The computer program product according to claim 18, wherein the transmitting the received data packet further comprises throttling at least one data transmission on a radio bearer associated with the radio link to increase available bandwidth for transmission of the received data packet.

20. The computer program product according to claim 16, wherein the data packet is a video data packet;
the data required by the user device includes data required for reproduction of the video data packet on the user device.

* * * * *